(12) United States Patent
Kono et al.

(10) Patent No.: US 10,052,507 B2
(45) Date of Patent: Aug. 21, 2018

(54) FIRE EXTINGUISHING SYSTEM OF AIRCRAFT, AND AIRCRAFT

(71) Applicant: MITSUBISHI AIRCRAFT CORPORATION, Aichi (JP)

(72) Inventors: Takafumi Kono, Aichi (JP); Yuya Kojima, Aichi (JP); Koichiro Fushiya, Aichi (JP); Kyoichi Wada, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 376 days.

(21) Appl. No.: 14/587,555

(22) Filed: Dec. 31, 2014

(65) Prior Publication Data

US 2015/0283412 A1 Oct. 8, 2015

(30) Foreign Application Priority Data

Jan. 17, 2014 (JP) .................. 2014-006647

(51) Int. Cl.
*A62C 3/08* (2006.01)
*F16L 3/08* (2006.01)
(Continued)

(52) U.S. Cl.
CPC ................ *A62C 3/08* (2013.01); *A62C 35/58* (2013.01); *B64D 25/00* (2013.01); *F16L 3/08* (2013.01);
(Continued)

(58) Field of Classification Search
CPC .... A62C 3/08; A62C 3/07; A62C 3/10; A62C 35/58; F16L 11/00; F16L 27/0861; F16L 27/107; F16L 3/08; B64D 25/00
(Continued)

(56) References Cited

U.S. PATENT DOCUMENTS 5,327,976 A * 7/1994 Hattori .................. A61C 35/68
169/16
6,158,519 A * 12/2000 Kretschmer ......... A62C 35/645
169/16
(Continued)

FOREIGN PATENT DOCUMENTS

JP H06170008 A 6/1994
JP 2003144568 A 5/2003
(Continued)

OTHER PUBLICATIONS

Japanese Office Action with translation for corresponding Japanese Application No. 2014-006647 dated Aug. 29, 2017.

*Primary Examiner* — Jason Boeckmann

(74) *Attorney, Agent, or Firm* — Pearne & Gordon LLP

(57) ABSTRACT

A fire extinguishing system of an aircraft including: a fire extinguishing nozzle that is provided on an installation member forming a compartment of the aircraft; and a fire extinguishing pipe that is provided on a support structure supporting the installation member from a back side, and supplies a fire extinguishing agent to the fire extinguishing nozzle, wherein the fire extinguishing pipe includes a first pipe that is supported by a first support member constituting the support structure, a second pipe that is supported by a second support member constituting the support structure and crossing the first support member, and a tube having flexibility that connects the first pipe and the second pipe.

15 Claims, 7 Drawing Sheets

(51) Int. Cl.
  *F16L 11/00* (2006.01)
  *B64D 25/00* (2006.01)
  *A62C 35/58* (2006.01)
  *F16L 27/08* (2006.01)
  *F16L 27/107* (2006.01)
  *A62C 3/07* (2006.01)
  *A62C 3/10* (2006.01)

(52) U.S. Cl.
  CPC ................. *F16L 11/00* (2013.01); *A62C 3/07* (2013.01); *A62C 3/10* (2013.01); *F16L 27/0861* (2013.01); *F16L 27/107* (2013.01)

(58) Field of Classification Search
  USPC ...................................................... 169/53, 62
  See application file for complete search history.

(56) References Cited

U.S. PATENT DOCUMENTS

| | | | |
|---|---|---|---|
| 6,536,710 B1* | 3/2003 | Bobzien | ................. B64C 1/066 244/119 |
| 2003/0136879 A1 | 7/2003 | Grabow et al. | |
| 2005/0182869 A1 | 8/2005 | Lazzarini | |
| 2010/0252684 A1 | 10/2010 | Stephan | |
| 2012/0255746 A1 | 10/2012 | Johnsen et al. | |
| 2013/0187001 A1 | 7/2013 | Gensch et al. | |

FOREIGN PATENT DOCUMENTS

| | | |
|---|---|---|
| JP | 2010538890 A | 12/2010 |
| JP | 2011502859 A | 1/2011 |

* cited by examiner

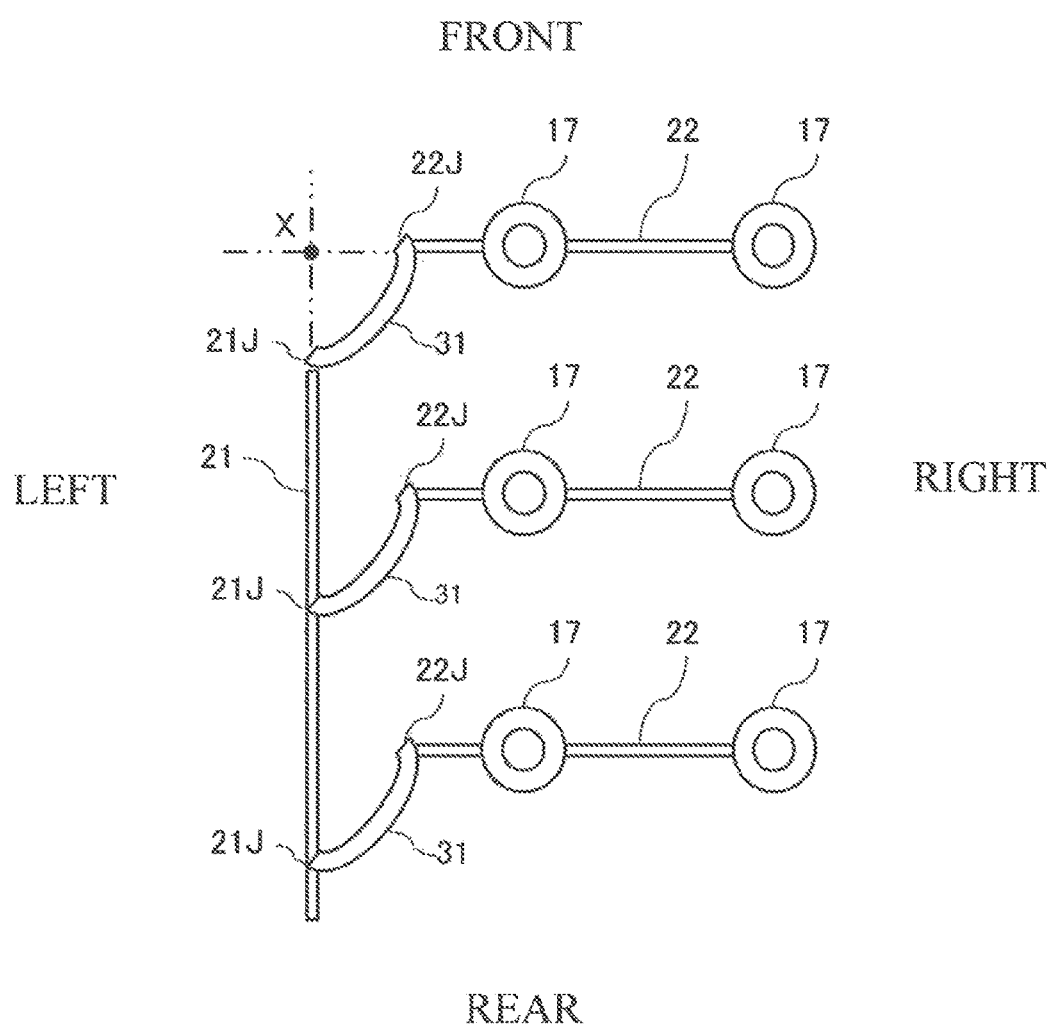

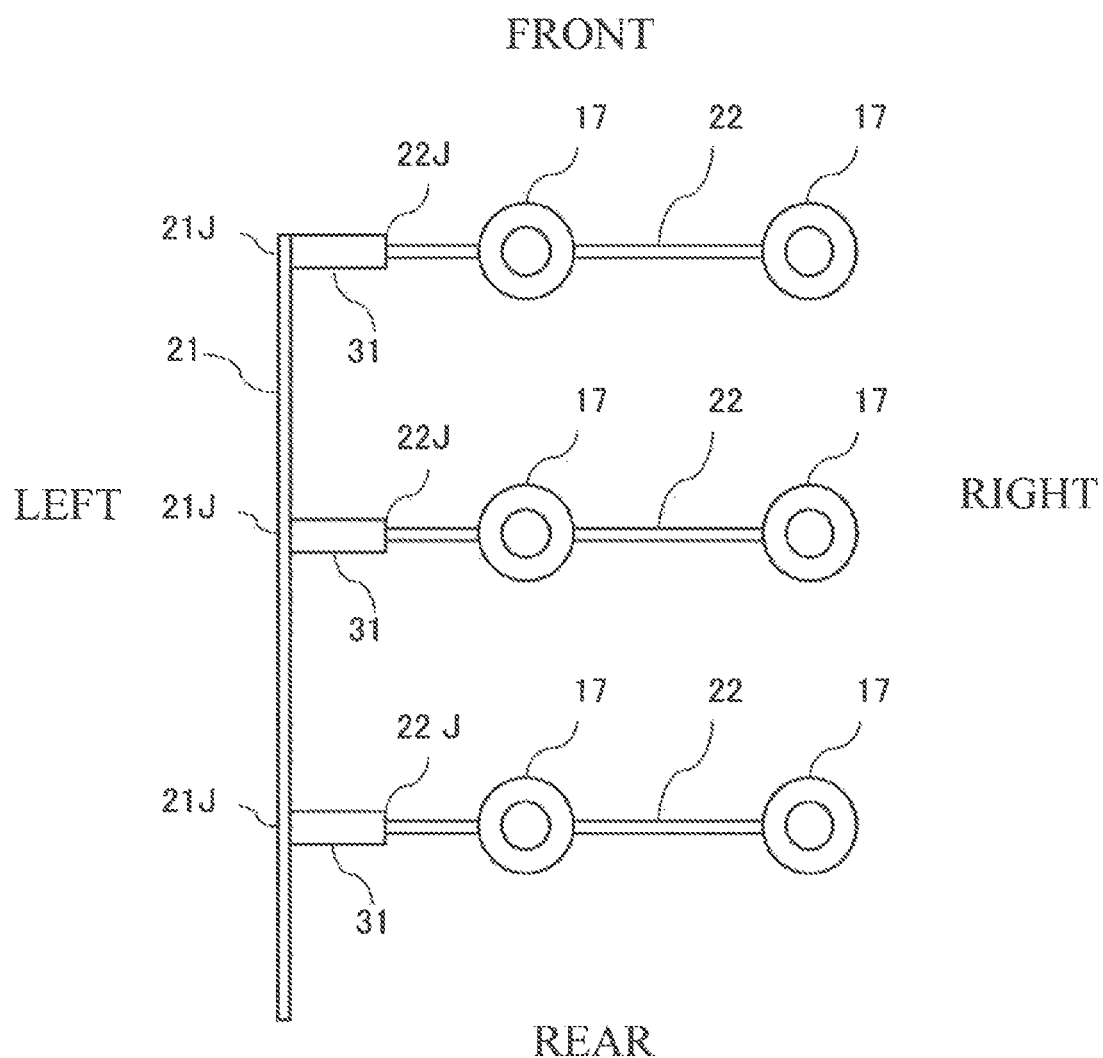

FIRE EXTINGUISHING SYSTEM OF AIRCRAFT, AND AIRCRAFT

BACKGROUND OF THE INVENTION

Field of the Invention

The present invention relates to a fire extinguishing system of an aircraft including a fire extinguishing pipe that is provided on a support structure supporting, from the back side, an installation member that forms a compartment, and an aircraft including the fire extinguishing system.

Description of the Related Art

A compartment, such as a cargo hold, an engine compartment, and an auxiliary power unit compartment, of aircraft is provided with a fire extinguishing system that injects a fire extinguishing agent from a fire extinguishing nozzle installed on an installation member (liner) forming the compartment in preparation for a fire (U.S. Patent Application Publication No. 2012/0255746).

A fire extinguishing pipe laid on the back side of the installation member is connected to the fire extinguishing nozzle.

Typically, a plurality of fire extinguishing nozzles are provided in one compartment. The fire extinguishing pipe is arranged from a tank in which the fire extinguishing agent is enclosed to the respective fire extinguishing nozzles.

The fire extinguishing pipe is supported by a skeleton that is located on the back side of the installation member with a clamp or the like.

The skeleton includes a plurality of members. If an article brought into the compartment explodes and an impact load from the explosion is transmitted to the skeleton via the installation member, the individual members may be displaced in different directions or by different displacement amounts.

Thus, an object of the present invention is to provide a fire extinguishing system of an aircraft capable of securing a fire extinguishing function without causing damage to a fire extinguishing pipe upon receiving an excessive stress even when an impact load from a blast or the like is transmitted to a support member of the fire extinguishing pipe, and an aircraft including the fire extinguishing system.

SUMMARY OF THE INVENTION

A fire extinguishing system of an aircraft according to the present invention includes: a fire extinguishing nozzle that is provided on an installation member forming a compartment; and a fire extinguishing pipe that is provided on a support structure supporting the installation member from a back side, and supplies a fire extinguishing agent to the fire extinguishing nozzle.

The support structure includes a first support member, and a second support member separately from the first support member.

In the present invention, the fire extinguishing pipe includes a first pipe that is supported by the first support member, a second pipe that is supported by the second support member crossing the first support member, and a tube having flexibility that connects the first pipe and the second pipe.

In the present invention, to avoid application of an excessive stress to the fire extinguishing pipe when an impact load from an explosion or the like is transmitted to the first support member and the second support member via the installation member, the first pipe and the second pipe supported by the separate support members are connected via the tube.

Since the tube has flexibility, the tube is elastically deformed in any form such as pulled, compressed, bent, and twisted forms according to the respective behaviors of the first pipe following the first support member and the second pipe following the second support member. Accordingly, the tube can absorb relative displacement between the first pipe and the second pipe, thereby avoiding application of an excessive stress to the first pipe and the second pipe and preventing damage thereto.

In the fire extinguishing system of the present invention, when a plurality of support members exist, the first pipe is preferably supported by the single first support member, and the second pipe is preferably supported by the single second support member.

Accordingly, the respective pipes are not laid over a plurality of support members. Even when the plurality of support members behave respectively, the respective pipes only follow the support members where the respective pipes are supported. The relative displacement between the first pipe and the second pipe is absorbed by the above operation by the tube.

In the fire extinguishing system of the present invention, the tube is preferably covered with a cover facing the back side of the installation member.

The cover can protect the tube from a flying object or the like passing through the installation member.

In the fire extinguishing system of the present invention, it is preferable that the cover is formed in a plate-like shape, and has a wall that rises from a peripheral edge, and surrounds the tube.

The wall can more surely protect the tube from a flying object flying obliquely with respect to the installation member.

In the fire extinguishing system of the present invention, the tube is preferably longer than a distance between a connection section of the first pipe and a connection section of the second pipe connected via the tube.

Accordingly, an end of the tube can be displaced by the amount of a difference between the distance between the connection section of the first pipe and the connection section of the second pipe, and the length of the tube. Larger relative displacement can be absorbed by the displacement of the end of the tube.

In the fire extinguishing system of the present invention, the connection section of the first pipe and the connection section of the second pipe are preferably shifted from each other in two or more directions with respect to a virtual intersection obtained when the first pipe and the second pipe are extended.

By reference to FIG. 4, a connection section 21J and a connection section 22J are shifted from each other in a longitudinal direction and a right-left direction with respect to a virtual intersection X obtained when a first pipe 21 and a second pipe 22 are extended.

Accordingly, the tube can be displaced in two or more directions, so that displacement in various directions can be absorbed by the displacement of the tube.

An aircraft of the present invention includes the above fire extinguishing system.

Here, the above fire extinguishing system may be used for extinguishing a fire in any compartment formed in the aircraft.

Particularly, the fire extinguishing system is preferably used for extinguishing a fire in a cargo hold that is a compartment into which an explosive is likely to be brought under the cover of cargo.

In the aircraft of the present invention, it is preferable that the support structure is a structure of a fuselage, the first support member is a stringer that constitutes a structural member of the fuselage, and the second support member is a frame that constitutes another structural member of the fuselage.

A pipe structure of an aircraft of the present invention is a pipe structure that is provided on a support structure supporting, from a back side, an installation member forming a compartment, the pipe structure including: a first pipe that is supported by a first support member constituting the support structure; a second pipe that is supported by a second support member constituting the support structure and crossing the first support member; and a tube having flexibility that connects the first pipe and the second pipe.

In accordance with the present invention, the same operations and effects as those of the aforementioned fire extinguishing system can be obtained.

In accordance with the present invention, a fire extinguishing function, or a function of a system including the pipe structure can be secured without causing damage to the fire extinguishing pipe upon receiving an excessive stress even when an impact load from a blast or the like is transmitted to the support member of the fire extinguishing pipe.

BRIEF DESCRIPTION OF THE DRAWINGS

FIG. 4 is a schematic view illustrating a positional relationship between a connection section of a first pipe and a connection section of a second pipe;

FIGS. 5A and 5B are views illustrating modifications of the fire extinguishing pipe of the present invention.

DETAILED DESCRIPTION OF THE PREFERRED EMBODIMENTS

In the following, an embodiment of the present invention is described by reference to the accompanying drawings.

In the present embodiment, a fire extinguishing system that extinguishes a fire in a cargo hold (cargo room) of an aircraft is described as an example.

[Structure of a Fuselage]

Figure 1:
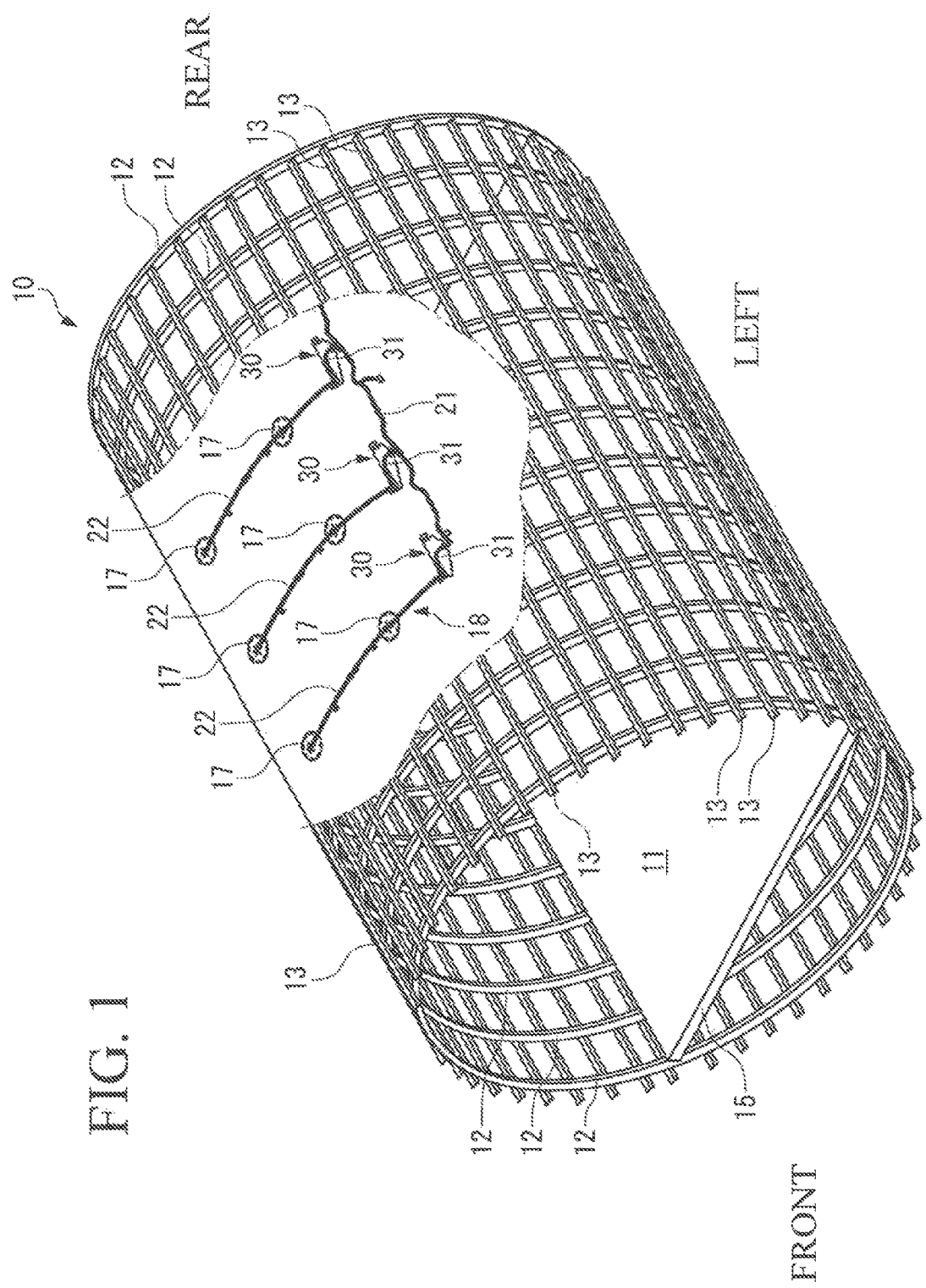
FIG. 1 is a perspective view illustrating the structure of a rear portion of a fuselage of an aircraft where a cargo hold is arranged, and a fire extinguishing system for extinguishing a fire in the cargo hold, according to an embodiment of the present invention.

A cargo hold 11 shown in FIG. 1 is arranged in a rear portion of a cylindrical fuselage of an aircraft.

A structure 10 of the fuselage (referred to as a fuselage structure below) includes a plurality of frames 12 and a plurality of stringers 13 that make up a skeleton of the fuselage, and a skin (not shown) that forms an outer surface of the fuselage.

The frames 12 are formed in a ring shape, and arranged at longitudinal intervals.

The stringers 13 extend in a longitudinal direction perpendicular to the respective frames 12, and provided on the back side of the skin. The stringers 13 are attached to the outer peripheries of the frames 12 at predetermined circumferential intervals.

Recessed portions 120 (FIG. 3) for passing the stringers 13 are formed in the outer peripheries of the frames 12. The frames 12 and the stringers 13 are attached to each other in the vicinity of the recessed portions 120.

The frames 12 and the stringers 13 function as support members that support a fire extinguishing pipe 18 described below.

[Installation Member]

A liner 14 for a wall and a ceiling (FIGS. 2 and 3) of the cargo hold 11, a liner 15 for a floor (FIG. 1) of the cargo hold 11, and liners (not shown) respectively located at a front end and a rear end of the cargo hold 11 are provided within the fuselage structure 10. The liners (installation members) are supported by the fuselage structure 10, and form an indoor space (compartment) of the cargo hold 11.

The liners are formed of a material having predetermined fire resistance. The liners of the present embodiment are formed of glass fiber reinforced plastics (GFRP) containing glass fiber.

[Configuration of the Fire Extinguishing System]

Figure 2:
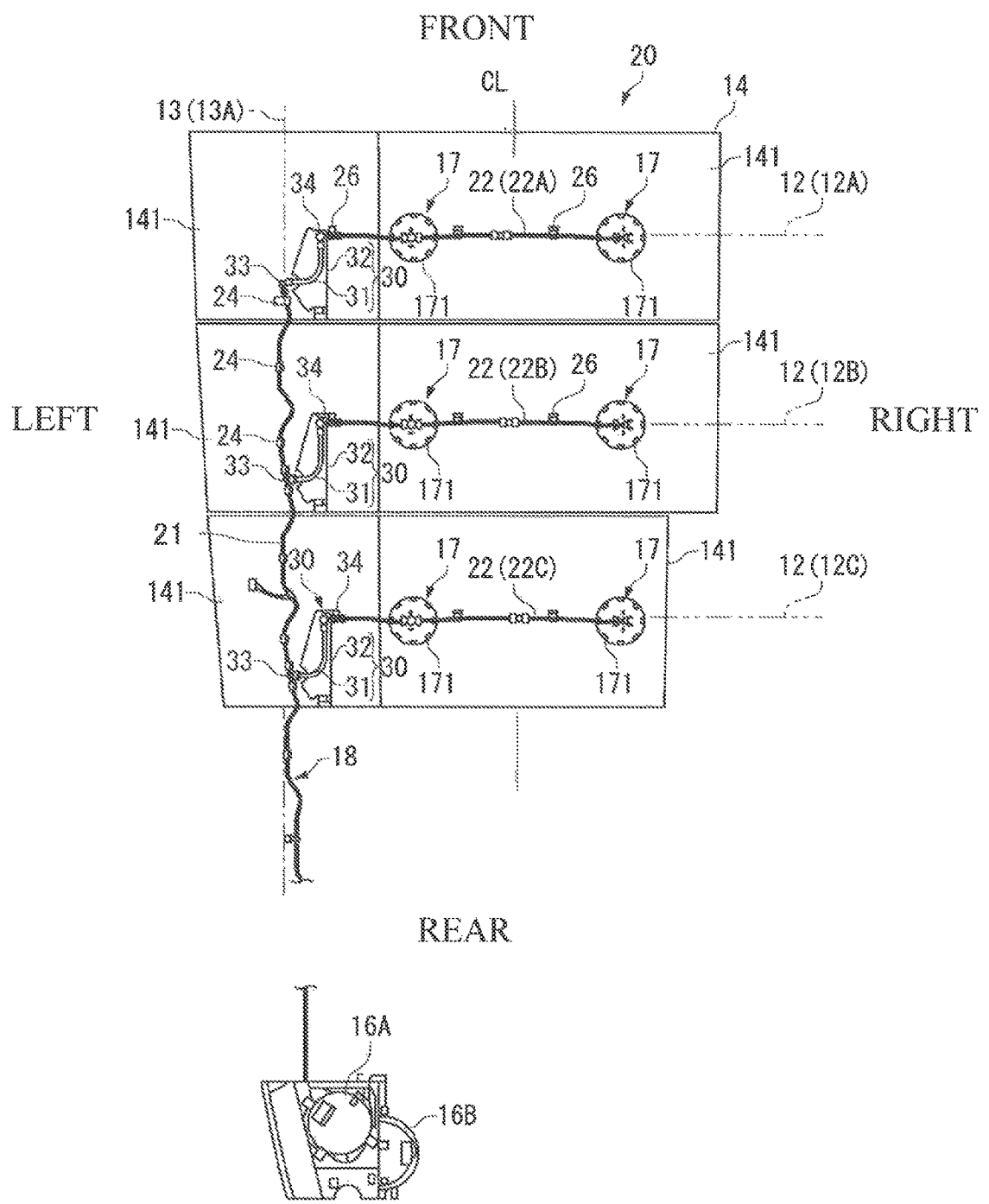
FIG. 2 is a plan view illustrating an installation member and the fire extinguishing system.

As shown in FIG. 2, a fire extinguishing system 20 that extinguishes a fire in the cargo hold 11 includes a high-pressure tank 16A and a low-pressure tank 16B that serve as a source for supplying a fire extinguishing agent, a plurality of nozzle devices 17 that inject the fire extinguishing agent into the cargo hold 11, the fire extinguishing pipe 18 that supplies the fire extinguishing agent from the tanks 16A and 16B to the respective nozzle devices 17, and a tube attachment body 30 that is located at a position where the fire extinguishing pipe 18 is laid over a plurality of members of the fuselage structure 10.

[Tank]

A halon fire extinguishing agent such as Halon 1301, Halon 1211, and Halon 2402, a hydrofluorocarbon fire extinguishing agent such as HFC-227ea and HFC-23, or the like is enclosed in the high-pressure tank 16A and the low-pressure tank 16B. The fire extinguishing agent in the high-pressure tank 16A has a higher pressure than the fire extinguishing agent in the low-pressure tank 16B. The high-pressure tank 16A is used for rapidly supplying the fire extinguishing agent so as to extinguish a fire in an early stage. The low-pressure tank 16B is used for continuously supplying the fire extinguishing agent for a longer time than that of the high-pressure tank 16A so as to complete fire extinction.

The tanks 16A and 16B are installed between a firewall (not shown) located behind the cargo hold 11, and an aft pressure bulkhead (not shown) provided behind the firewall.

[Nozzle Device]

The number of the nozzle devices 17 is six in the present embodiment. In a ceiling portion of the liner 14, the total of six nozzle devices 17, three in the longitudinal direction and two in a right-left direction, are arranged at predetermined intervals. A center line CL of the ceiling portion (the twelve o'clock position) is set between the nozzle devices 17 located on the left side and the nozzle devices 17 located on the right side.

Each of the nozzle devices 17 includes a nozzle (not shown) that injects the fire extinguishing agent into the cargo hold 11 through an opening formed in the liner 14, a pan 171 that is provided on the back side of the liner 14, and to which the nozzle is attached, and a seal (not shown) that closes a gap between the nozzle and the pan 171.

[Fire Extinguishing Pipe]

The fire extinguishing pipe 18 is arranged on the back side of the liner 14. The liner 14 is composed of a plurality of divided panels 141. The panels 141 are installed in an arc shape inside the fuselage structure 10.

The fire extinguishing pipe 18 includes a first pipe 21 that is connected to the tanks 16A and 16B on the rear end side, and extends to the front side along the outer periphery of the liner 14, and a plurality of (here, three) second pipes 22 that branch from the first pipe 21 toward the nozzle devices 17.

[First Pipe]

The first pipe 21 rises (not shown) along the outer periphery of the liner 14 from the position of the tanks 16A and 16B, and extends to the front side on the left side of the center line CL.

Figure 3:
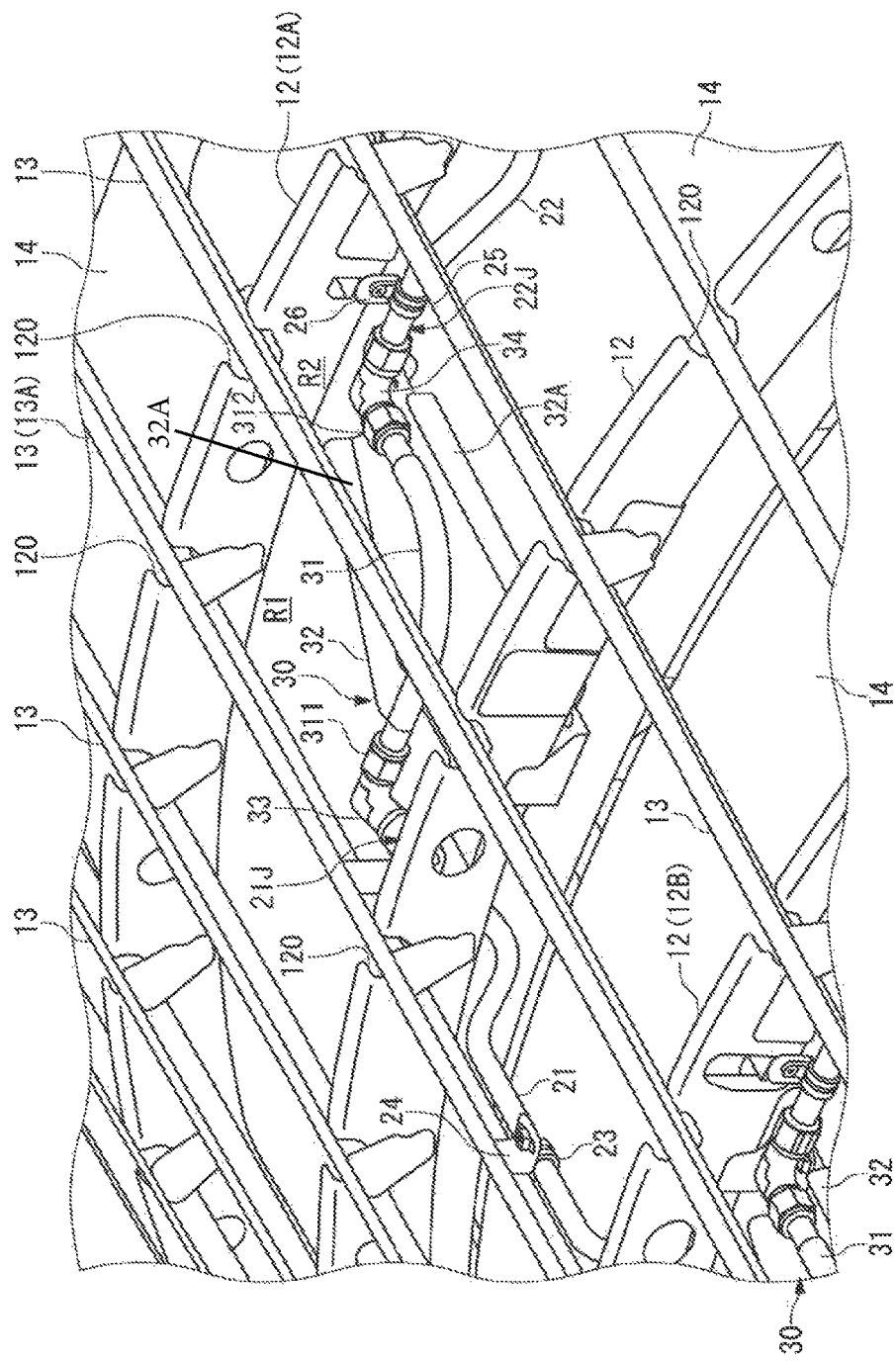
FIG. 3 is a perspective view illustrating a position where a fire extinguishing pipe is supported on both of a frame and a stringer, and illustrating a tube attachment body shown in the upper left of FIG. 2.

The first pipe 21 extends along the stringer 13 arranged along a one-dot chain line shown in FIG. 2. The first pipe 21 is supported by the stringer 13 between the adjacent frames 12 and 12 as shown in FIG. 3. A portion interfering with the frame 12 is formed so as to be bent and pass under the lower side of the frame 12.

The first pipe 21 is supported by the stringer 13 by fastening a clamp 23 fitted to the first pipe 21 and a bracket 24 provided on the stringer 13 with a bolt.

[Second Pipe]

On the other hand, each of the second pipes 22 is connected to the first pipe 21 via a tube 31 of the tube attachment body 30, and extends to the right side perpendicular to the first pipe 21 as shown in FIG. 2. Each of the second pipes 22 is connected, via a joint, to the nozzles of the two nozzle devices 17 arranged on the right and left sides.

The second pipes 22 extend along the frames 12 arranged along two-dot chain lines shown in FIG. 2. The second pipes 22 are supported by the frames 12 between the adjacent stringers 13 and 13 as shown in FIG. 3. To be more specific, each of the second pipes 22 is supported by the frame 12 by fastening a clamp 25 fitted to the second pipe 22 and a bracket 26 provided on the frame 12 with a bolt.

The first pipe 21 is supported by one stringer 13 (13A) at a plurality of positions in a length direction by using the clamps 23 and the brackets 24.

The second pipes 22 (22A, 22B, 22C) are also respectively supported by the frames 12 (12A, 12B, 12C) at a plurality of positions in a length direction by using the clamps 25 and the brackets 26.

The positions where the first pipe 21 is supported, and the positions where the second pipes 22 are supported are appropriately determined. The pitch of the support positions is adjusted to obtain a natural frequency suitable for avoiding resonance.

As shown in FIG. 4, in the present embodiment, a connection section 21J of the first pipe 21 and a connection section 22J of the second pipe 22 connected via the tube 31 are located at positions shifted in the longitudinal direction based on a positional relationship between the connection section 21J and the connection section 22J shown in FIG. 5A.

More specifically, the connection section 21J of the first pipe 21 is located on the rear side in a region R1 surrounded by the adjacent stringers 13 and 13 and the adjacent frames 12 and 12 as shown in FIG. 3.

The connection section 22J of the second pipe 22 is located on the front side in a region R2 on the right side of the region R1.

Moreover, the connection section 22J of the second pipe 22 is located at a position shifted in a vertical direction with respect to the connection section 21J of the first pipe 21. To be more specific, the connection section 22J of the second pipe 22 is located below the connection section 21J of the first pipe 21.

As described above, the connection section 21J of the first pipe 21 and the connection section 22J of the second pipe 22 are arranged in a staggered shape. This is to absorb displacement in various directions by displacement of the tube 31 as described below.

However, the connection section 22J of the second pipe 22 may be also located on the right side of the connection section 21J of the first pipe 21 as shown in FIG. 5A. The connection section 21J and the connection section 22J are arranged apart from each other in the right-left direction (shifted in the right-left direction) by the length of the tube 31.

[Tube Attachment Body]

The tube attachment body 30 connects the first pipe 21 and the second pipe 22 so as to enable relative displacement. The number of the tube attachment bodies 30 is three in the present embodiment.

Each of the tube attachment bodies 30 includes the tube 31 that connects the first pipe 21 and the second pipe 22, and a cover 32 that covers the tube 31 from the lower side as shown in FIGS. 2 and 3.

[Tube]

The tube 31 is formed of a resin material such as PTFE (polytetrafluoroethylene), PFA (perfluoroalkoxy fluororesin), FEP (a copolymer of tetrafluoroethylene and hexafluoropropylene), and ETFE (a copolymer of tetrafluoroethylene ($C_2F_4$) and ethylene ($C_2H_4$)), and has flexibility. The tube 31 may be obtained by coating the outer periphery of an inner tube formed of a resin-based material with a mesh tube made of metal.

As the tube 31 of the present embodiment, a tube obtained by coating the outer side a tube made of a fluorine-based resin material with a mesh of stainless steel is used.

Mouthpieces 311 and 312 are provided on both ends of the tube 31. The mouthpiece 311 on one side is connected to the connection section 21J of the first pipe 21 via a joint 33.

The tube 31 of the tube attachment body 30 shown in the center of FIG. 3 is connected to the first pipe 21 via the joint 33 having an L shape so as to be connected to a front end of the first pipe 21. The respective tubes 31 of the remaining two tube attachment bodies 30 are connected to the first pipe 21 via the joints 33 having a T shape (FIG. 2).

The mouthpiece 312 on the other side provided on the tube 31 is connected to the connection section 22J of the second pipe 22 via a joint 34 having an L shape (FIG. 3).

The length of the tube 31 that connects the connection section 21J of the first pipe 21 and the connection section 22J of the second pipe 22 is set to a dimension obtained by adding a margin in expectation of displacement amounts in three directions including the longitudinal, right-left, and vertical directions to a distance between the connection sections 21J and 22J. Therefore, the tube 31 extends in a slightly curved state between the connection section 21J of the first pipe 21 and the connection section 22J of the second pipe 22.

[Cover]

The cover 32 protects the tube 31 from a flying object passing through the liner 14 or the like. An example of the flying object includes a bullet fired in the cargo hold 11.

The above fire extinguishing pipe 18 is formed of a material that is not damaged even upon receiving an impact from the flying object as described above. In the present embodiment, aluminum alloy is used.

The cover 32 is formed of metal or fiber reinforced plastics having predetermined strength and heat resistance so as to prevent damage to the tube 31 by the flying object as described above.

The cover 32 of the present embodiment is formed of aluminum alloy with an appropriate thickness.

The cover 32 of the present embodiment is formed in a plate-like shape, and arranged on the lower side of the tube 31 so as to face the liner 14.

The cover 32 is set to a flat shape covering a substantially entire region where the tube 31 is projected from above. The cover 32 entirely covers the tube 31 from the lower side. Here, the mouthpieces 311 and 312 may be located outside the cover 32.

A wall 32A formed by bending rises from a peripheral edge of the cover 32 in a direction away from the liner 14. The wall 32A is formed at a position excluding the both end portions of the tube 31 in the peripheral edge of the cover 32. Since the tube 31 is surrounded by the wall 32A from the lateral side, the tube 31 can be more surely protected from a bullet fired obliquely with respect to the liner 14.

The cover 32 is fixed to the frame 12 with a bolt or the like. The cover 32 may be also fixed to the stringer 13.

[Fire Extinction in the Cargo Hold]

The fire extinguishing system 20 of the present embodiment is automatically activated when the outbreak of a fire in the cargo hold 11 is detected by a fire detection system (not shown).

The fire extinguishing system 20 first opens a valve of the high-pressure tank 16A, and rapidly supplies the fire extinguishing agent to the respective nozzle devices 17 through the fire extinguishing pipe 18. Subsequently, the fire extinguishing system 20 opens a valve of the low-pressure tank 16B, and continues to supply the fire extinguishing agent to the respective nozzle devices 17.

By injecting the fire extinguishing agent from the nozzles of the nozzle devices 17, the density of the fire extinguishing agent in the cargo hold 11 is increased, and a combustion reaction is inhibited by the fire extinguishing agent, so that the fire is extinguished.

[Protection from Explosion]

By the way, an explosive may be brought into the cargo hold 11 as cargo. When the explosive explodes, an impact load from a blast is applied to the liner 14. When the impact load is transmitted to the skeleton of the fuselage structure 10 via the liner 14, the respective members making up the skeleton, namely, the respective plurality of frames 12 and the respective plurality of stringers 13 may behave individually to be displaced. That is, one member and another member out of the plurality of frames 12 and the plurality of stringers 13 may be displaced in different directions and by different displacement amounts.

In the present embodiment, the first pipe 21 is supported by the single stringer 13 (13A) so as to avoid application of an excessive stress to the fire extinguishing pipe 18 in the above case.

The second pipe 22A is supported by the single frame 12A, the second pipe 22B is supported by the single frame 12B, and the second pipe 22C is supported by the single frame 12C.

That is, the support members and the pipes correspond to each other one by one.

Moreover, the first pipe 21 and the second pipe 22 supported by the separate support members are connected via the tube 31.

Since the tube 31 has flexibility, the tube 31 is elastically deformed in any state such as pulled, compressed, bent, and twisted states according to the respective behaviors of the first pipe 21 following the stringer 13 and the second pipe 22 following the frame 12. Accordingly, the tube 31 can absorb relative displacement between the first pipe 21 and the second pipe 22, thereby avoiding application of an excessive stress to the first pipe 21 and the second pipe 22 and preventing damage thereto.

Furthermore, in the present embodiment, the tube 31 is set to a longer dimension than the distance between the connection section 21J of the first pipe 21 and the connection section 22J of the second pipe 22. Thus, the end portion of the tube 31 can be displaced by the amount of a difference (the margin amount) between the distance and the length of the tube 31. Larger displacement can be absorbed by the displacement of the tube 31.

Figure 6A:
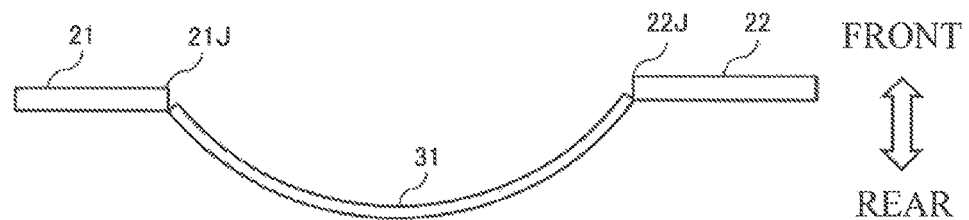
FIGS. 6A, 6B and 6C are schematic views for explaining displacement of a tube.
Figure 6B:
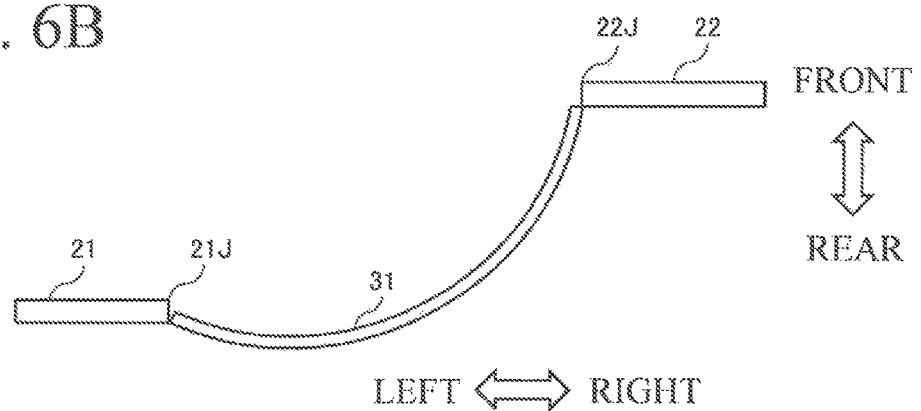

Here, when the connection section 21J of the first pipe 21 and the connection section 22J of the second pipe 22 are longitudinally shifted, the tube 31 can be displaced in the right-left direction (FIG. 6B) in addition to displacement in the longitudinal direction when the connection sections are not shifted (FIG. 6A).

Figure 6C:
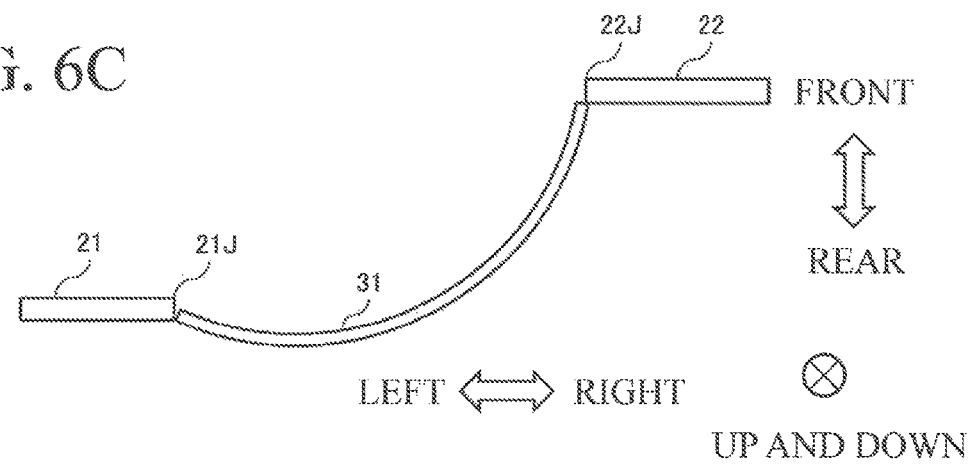

Moreover, when the connection sections are vertically shifted, the tube 31 can be further displaced in the vertical direction (FIG. 6C).

That is, when the connection section 21J of the first pipe 21 and the connection section 22J of the second pipe 22 are shifted, displacement in various directions can be absorbed by the displacement of the tube 31.

The constitutions described in the aforementioned embodiment may be also freely selected or appropriately changed into other constitutions without departing from the gist of the present invention.

The first pipe 21 and the second pipes 22 can be arranged in any manner.

Figure 5B:
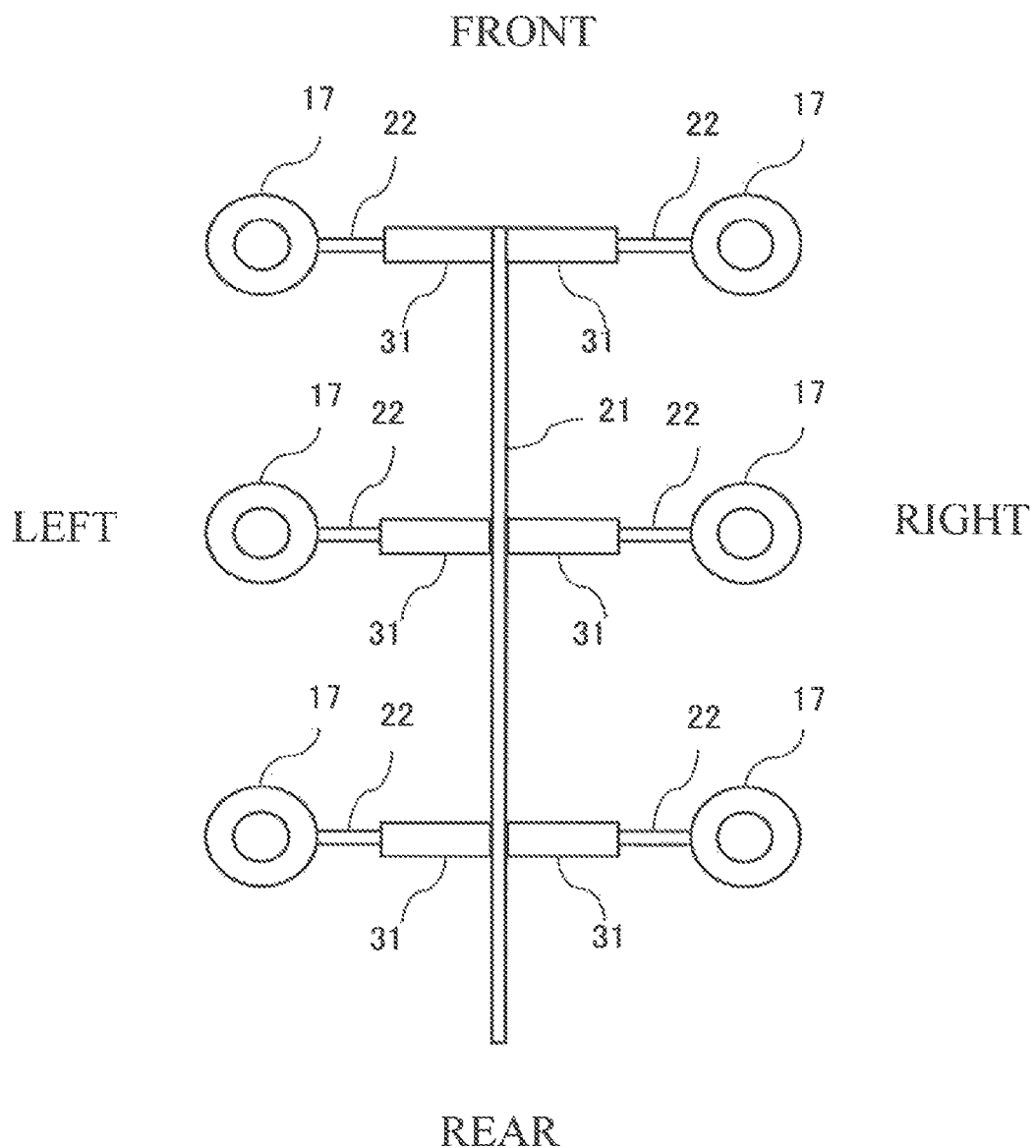

For example, the second pipes 22 may be connected to the both right and left sides of the first pipe 21 as shown in FIG. 5B.

Also, the fire extinguishing pipe 18 may include the first pipe 21 supported by another stringer 13 separately from the first pipe 21 supported by the single stringer 13.

The present invention can be applied to a fire extinguishing system for a cargo hold that is arranged below a cabin of an aircraft.

The present invention can be also applied to fire extinguishing systems for various compartments provided in an aircraft, such as an engine compartment that accommodates an engine of the aircraft, and an auxiliary power unit compartment that accommodates an auxiliary power unit, in addition to the cargo holds of the aircraft.

Furthermore, the present invention is not limited to the aircraft, and can be also applied to fire extinguishing systems for various compartments in, for example, ships, trains, and buildings.

Moreover, the present invention is not limited to the fire extinguishing system, and can be also applied to a pipe structure constituting various systems such as fuel and ventilating systems.

What is claimed is:

1. An aircraft including a fire extinguishing system, the fire extinguishing system comprising:
    a fire extinguishing nozzle that is provided on an installation member forming a compartment of the aircraft;
    a fire extinguishing pipe that is provided on a support structure supporting the installation member from a back side, and supplies a fire extinguishing agent to the fire extinguishing nozzle,
    wherein the fire extinguishing pipe includes
        a first pipe that is supported by a first support member constituting the support structure,
        a second pipe that is supported by a second support member constituting the support structure and crossing the first support member, and
        a tube having flexibility and connecting the first pipe and the second pipe; and
    a plate-like cover having a planar surface extending between the tube and a liner of the aircraft and opposing side walls extending on opposite sides of the tube.

2. The aircraft according to claim 1,
    wherein the first pipe is supported by the single first support member, and
    the second pipe is supported by the single second support member.

3. The aircraft according to claim 1,
    wherein the tube is longer than a distance between a connection section of the first pipe and a connection section of the second pipe connected via the tube.

4. The aircraft according to claim 3,
    wherein the connection section of the first pipe and the connection section of the second pipe are shifted from each other in two or more directions with respect to a virtual intersection obtained when the first pipe and the second pipe are extended.

5. The aircraft according to claim 1,
    wherein the tube is formed of a resin material.

6. The aircraft according to claim 1,
    wherein the tube is formed by coating an outer periphery of an inner tube formed of a resin material with a mesh tube made of metal.

7. The aircraft according to claim 1,
    wherein the support structure is a structure of a fuselage,
    the first support member is a stringer that constitutes a structural member of the fuselage, and
    the second support member is a frame that constitutes another structural member of the fuselage.

8. The aircraft according to claim 7,
    wherein the first pipe is supported by the stringer between adjacent frames.

9. The aircraft according to claim 7,
    wherein the second pipe is supported by the frame between adjacent stringers.

10. The aircraft according to claim 1,
    wherein the fire extinguishing nozzle is connected to the second pipe which is supported by the frame.

11. The aircraft according to claim 1,
    wherein the compartment is a cargo hold that accommodates cargo.

12. The aircraft according to claim 1,
    wherein the tube is directly connected to the first pipe and the second pipe.

13. The aircraft according to claim 1,
    wherein the first pipe is extended along the first support structure,
    the second pipe is extended along the second support structure, and
    the tube is provided in a virtual intersection defined by extended centerlines of the first pipe and the second pipe, or in an area in which the first pipe and the second pipe cross.

14. The aircraft according to claim 1,
    wherein the tube connects the first pipe and the second pipe so as to enable relative displacement in an area in which the first pipe and the second pipe cross.

15. The aircraft according to claim 1,
    wherein the second pipe extends from one side of the first pipe and a L-shaped or T-shaped joint connects the tube to the first pipe.

* * * * *